3,385,869
PROCESS FOR THE PREPARATION OF 16β-ACYL-
OXY - 3,11 - DIKETO - 4α,8,14 - TRIMETHYL - 18-
NOR-5α,8α,9β,13α,14β-CHOLESTA-17(20), 24-DIEN-
21-OATE
Gerlad W. Krakower, Elizabeth, N.J., assignor to E. R.
  Squibb & Sons, Inc., New York, N.Y., a corporation
  of Delaware
No Drawing. Filed Mar. 21, 1966, Ser. No. 535,719
            2 Claims. (Cl. 260—397.1)

This invention relates to and has as its object the provision of new physiologically active steroids, processes for their production and novel intermediates useful in the preparation thereof.

More particularly, this invention relates to compounds having the formula

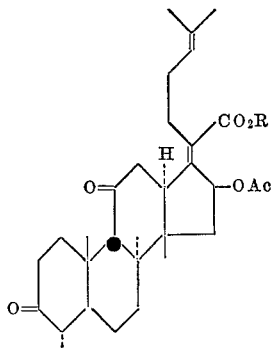

wherein R is lower alkyl and Ac is acyl.

The preferred acyl radicals are those of hydrocarbon carboxylic acids of less than twelve carbon atoms, as exemplified by the lower alkanoic acids (e.g., acetic, propionic, butyric and tert-pentanoic acid), the lower alkenoic acids, the monocyclic aryl carboxylic acids (e.g., benzoic and toluic acid), the monocyclic aryl lower alkanoic acids (e.g., phenacetic and β-phenylpropionic acid), the cycloalkane carboxylic acids and the cycloalkene carboxylic acids.

The novel compounds of this invention are pharmacologically active substances which possess anti-androgenic activity (i.e., they inhibit the actions of androgens), and which may be used in the treatment of such conditions as hyperandrogenic acne.

The compounds may be formulated for such administration, the concentration and/or dosage being based on the activity of the particular compound and the requirements of the patient.

The compounds of this invention may be prepared according to the novel process of this invention beginning with the alkali metal salt of fusidic acid, e.g., fusidic acid sodium or potassium salt.

The compounds of the invention may be prepared by esterifying fusidic acid alkali metal salt by the process of this invention and thereafter oxidizing the ester thus formed. It has been discovered that fusidic acid alkali metal salt may be esterified directly to the ester by reacting it with an alkyl halide in a suitable solvent heated at reflux temperatures.

Examples of alkyl halide that may be utilized in the practice of this invention are methyl iodide, ethyl chloride, butyl bromide, it being prepared to utilize primary alkyl halides of from one to four carbons. Suitable solvents that may be utilized are methanol, propanol, butanol, hexanol, and the like. The esters formed are isolated and purified by procedures known in the art. The compounds of the instant invention are then formed by oxidizing the intermediate ester in an appropriate solvent, i.e., acetic acid or acetone with an oxidizing agent, such as chromic acid in acetic acid or sulfuric acid, and the like.

Further, it has been discovered that the alkali metal salts of fusidic acid derivatives hydroxylated or acylated in the 3-, 11-, or 3- and 11-positions may be esterified in the manner set forth above. Derivatives of alkali metal salts of fusidic acid being saturated in the 24(25)-position or 17(20)-position may also be reacted in the manner set forth above to form the corresponding esters.

The following examples illustrate this invention. All temperatures are in degrees centigrade unless otherwise stated:

Example 1.—Methyl 16β-acetoxy-3,11-diketo-4α,8,14-trimethyl - 18 - nor - 5α,8α,9β,13α,14β - cholesta - 17(20), 24-dien-21-oate A solution of 10.00 g. of fusidic acid, sodium salt, in 20 ml. of methyl iodide and 100 ml. of methanol is refluxed for twenty-one hours. The solvent is evaporated and the residue taken up in methylene chloride. This solution is washed with 5% sodium bicarbonate and water, dried over magnesium sulfate and evaporated to give 10.30 g. of highly colored material. This material is dissolved in chloroform and passed through a column of 40 g. of neutral alumina (Activity I). The column is washed with benzene and the washings evaporated. The recovered material from the column weighs 9.20 g. On recrystallization from acetone-hexane, 6.39 g. of methyl fusidate are obtained.

A solution of the 6.39 g. of methyl fusidate in 100 ml. of acetone is oxidized at room temperature with an excess of chromic acid-sulfuric acid reagent. The excess reagent is decomposed with methanol and the solution diluted with water. After evaporation of the acetone, the organic material precipitates as a gum. This gum is separated, dissolved in ethyl acetate and the solution washed with saturated sodium chloride solution, dried and evaporated to give 5.60 g. of partially crystalline material. Recrystallization of this material from methanol-water gives methyl 16β-acetoxy-3,11-diketo-4α,8,14-trimethyl-18-nor-5α,8α,9β,13α,14β-cholesta-17(20), 24-dien-21-oate, M.P. 127–129° C. $[\alpha]_D$+118° (chloroform).

Analysis.—Calc'd for $C_{32}H_{46}O_6$: C, 72.97; H, 8.80. Found: C, 72.94; H, 8.76.

Example 2.—Ethyl 16β-acetoxy-3,11-diketo-4α,8,14-trimethyl - 18 - nor - 5α,8α,9β,13α,14β - cholesta - 17(20), 24-dien-21-oate Following the procedure of Example 1 but utilizing ethyl chloride in lieu of methyl iodide the product formed is ethyl 16β-acetoxy-3,11-diketo-4α,8,14-trimethyl-18-nor-5α,8α,9β,13α,14β-cholesta-17(20), 24-dien-21-oate.

The invention may be variously otherwise embodied within the scope of the appended claims.

What is claimed is:
1. A process which comprises reacting a steroid selected from the group consisting of an alkali metal salt of fusidic acid and an alkali metal salt of fusidic acid derivatives selected from the group consisting of 24(25)-dihydro fusidic acid and 24(25),17(20)-tetrahydro fusidic acid with an alkyl halide to form an alkyl ester, oxidizing with a chromic acid solution the alkyl ester and recovering a steroid having the structure

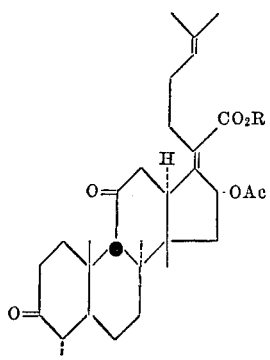

wherein R is lower alkyl and Ac is acyl, and derivatives thereof.

2. A process in accordance with claim 1 wherein the alkyl halide has from one to four carbons.

References Cited

UNITED STATES PATENTS 3,230,240   1/1966   Godtfredsen _____ 260—397.1

OTHER REFERENCES

Arigoni: "Experientia XIX 10," 1963, pp. 521–522.
Godtfredsen et al.: "Tetrahedron," 1962, vol. 18, pp. 1031–1040.

ELBERT L. ROBERTS, *Primary Examiner.*